US005144661A

United States Patent [19]

Shamosh et al.

[11] Patent Number: 5,144,661

[45] Date of Patent: Sep. 1, 1992

[54] SECURITY PROTECTION SYSTEM AND METHOD

[76] Inventors: Robert Shamosh, 486 Salem St., Paramus, N.J. 07652; Harvey N. Berlent, Closter Dock Rd., Alpine, N.J. 07620

[21] Appl. No.: 653,181

[22] Filed: Feb. 11, 1991

[51] Int. Cl.[5] ........................ H04K 1/02; G08B 21/00; H04N 7/18; H04N 5/225

[52] U.S. Cl. ........................................ 380/9; 340/540; 358/108; 358/909

[58] Field of Search ................ 358/108, 909; 340/540; 380/9

[56] References Cited

U.S. PATENT DOCUMENTS

| | | | |
|---|---|---|---|
| 3,885,090 | 5/1975 | Rosenbaum | 178/6.6 A |
| 4,054,752 | 10/1977 | Dennis et al. | 179/5 R |
| 4,401,976 | 8/1983 | Stadelmayr | 340/522 |
| 4,630,110 | 12/1986 | Cotton et al. | 358/108 |
| 4,651,143 | 3/1987 | Yamanaka | 340/691 |
| 4,758,888 | 7/1988 | Lapidot | 358/106 |
| 4,789,904 | 12/1988 | Peterson | 358/310 |
| 4,839,631 | 6/1989 | Tsuji | 340/541 |
| 4,876,597 | 10/1989 | Roy et al. | 358/141 |
| 4,942,464 | 7/1990 | Milatz | 358/108 |
| 5,012,335 | 4/1991 | Cohodar | 358/108 |

OTHER PUBLICATIONS

Sony MAVICA MVC-A10 Still Video Camera Brochure, Pub. No. AC-B-0535TYMP9002 (undated).

Sony MVC-2000 Still Video Camera Recorder Brochure, Pub. No. MK1708HP9002P2-006.5 (undated).

Sony MVR-5600 Still Video Recorder Brochure, Pub. No. Mk1571HP9001P5-007 (undated).

Sony MVP-660 Still Video Player Brochure, Pub. No. MK1573HP9001P5-007 (undated).

*Primary Examiner*—Stephen C. Buczinski

*Attorney, Agent, or Firm*—Davis Hoxie Faithfull & Hapgood

[57] ABSTRACT

A security protection system comprises sensors to detect an alarm condition and a controller that controls the operation of a still-video and audio recording unit. When the sensors activate the controller, the controller turns on appropriate lights and activates the recording unit, and the visual and audio signals from the recording unit are converted to digital and stored on a magnetic disk. The converted signals are also transmitted through a modem to a base location for contemporaneous monitoring of the events which triggered the sensor. The controller can also be activated manually, and may be reset in case of a false alarm. The base location is able to activate the controller for verification or retransmission of the signals.

33 Claims, 6 Drawing Sheets

SECURITY PROTECTION SYSTEM AND METHOD

FIELD OF THE INVENTION

The present invention relates to improved security protection systems, and particularly to systems (and related methods) that record video and audio signals, store them, and transmit them to a remote location for monitoring and processing.

BACKGROUND OF THE INVENTION

Many security and observation systems in the prior art use conventional video technology, employing standard video cameras to record a scene and video cassette recorders (VCR's) to store the video signals generated. Examples of such systems include Peterson U.S. Pat. No. 4,789,904 and Cotton et al. U.S. Pat. No. 4,630,110. The Peterson patent also discloses a microphone for pick-up and recording of accompanying audio information. Such systems have a number of disadvantages, including having numerous moving parts which wear and must be replaced, as well as the requirement of periodically rewinding the videotape. Additionally, communication of the continuous video signals to a remote location for observation must be over high-grade video cables instead of cheaper and more convenient telephone lines utilizing modems.

Other video-based systems employ continuous loop videotapes, which never need to be rewound. Examples of these systems include Dennis et al. U.S. Pat. No. 4,054,752 and Rosenbaum U.S. Pat. No. 3,885,090. There are also systems geared toward specific applications. See Milatz U.S. Pat. No. 4,942,464, Roy et al. U.S. Pat No. 4,876,597, and Lapidot U.S. Pat. No. 4,758,888, where the camera is stationary and therefore has a limited field of vision, and where there is no provision for pick up and recording of accompanying audio information.

There remains a need for a system which is mobile and transportable, can adapt to the ambient lighting conditions, can transmit a still frame color video with an accompanying audio in real time, and is capable of being interrogated from a remote location.

SUMMARY OF THE INVENTION

One aspect of the present invention combines heretofore discreet and separate components into a life saving, crime reducing, product. It provides criminal apprehension capabilities for the main stream of commercial and consumer protection. This will also result in significant savings to insurance companies, which will ultimately find its way into consumers' pockets In accordance with a principal aspect of the invention, a security protection system comprises sensor means for sensing an alarm condition and for generating a first signal when an alarm condition is sensed, and manual activation means for generating a second signal upon manual activation by a user. Video and audio recording means, responsive to the conditions represented by the first and second signals, record images and accompanying sound information, and generate corresponding video and audio signals. Memory converter means convert the video and audio signals to a format convenient for storage and transmission. Memory means store the converted signals, and transmission means transmit the converted signals to a base unit at a remote location.

Specifically, and in a principal embodiment, the images are recorded in still-video format, and the converted signals are in digital format. Control means responsive to the first and second signals control the video and audio recording means. The control means comprises control sequencer means responsive to the first and second signals for generating a third signal when the alarm condition is sensed or upon activation of the manual activation means, and sequence time controller means responsive to the third signal for controlling the video and audio recording means. Reset means are provide to reset the control means.

Also in the principal embodiment, the base unit comprises means for receiving the converted signals and means for storing the converted signals and for visual and audio presentation of the converted signals. A computer in the base unit controls the visual and audio presentation of the converted signals, and controls the video and audio recording means, the memory converter means, the memory means, and the transmission means. Printing means in the base unit print the visual portion of the converted signals. The converted signals are encrypted prior to transmission to the base unit, if desired, and decrypted subsequent to said transmission.

In accordance with a second aspect of the invention, a method of recording, storing, and observing at a remote location events relating to an alarm condition comprises the steps of sensing a first alarm condition, recording the events in still-video format and accompanying audio and producing corresponding electrical video and audio signals, converting the video and audio signals to digital signals, storing the digital signals, placing the memory location addresses of the stored information in a memory address register, transmitting the digital signals to a base location, and updating the memory address register to start position in preparation of receipt of further signals relating to a second alarm condition, while retaining the memory location addresses of the stored information for backup purposes.

DETAILED DESCRIPTION OF THE INVENTION

Figure 1:
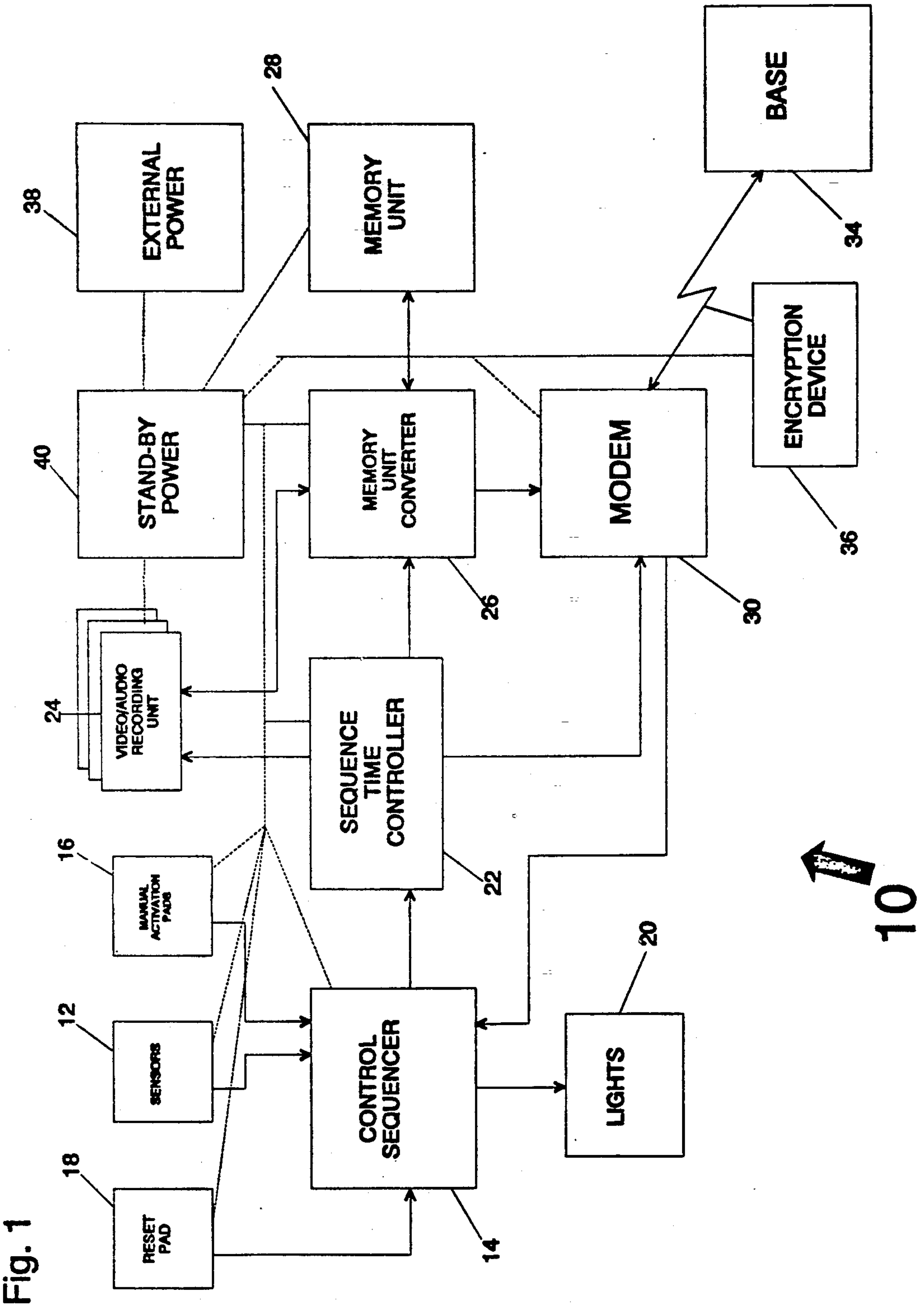
FIG. 1 is a block diagram of a preferred embodiment of a security protection system of the present invention.

Referring first to FIG. 1, a block diagram of a preferred embodiment of the invention is shown. A security protection system 10 incorporates the use of electronic still image color video and audio to record instantaneously the visual and audio events as they occur, and then to store or transmit the electronic images and audio to a remote viewing location, upon automatic or manual activation. The system can be reset by the user repeatedly by entering an appropriate code.

The system 10 includes alarm sensors 12, which are connected to a control sequencer 14. The alarm sensors 12 may include sensors of weight, movement, the presence of smoke or other materials, or any other type of suitable alarm sensor. A manual activation pad 16, consisting in the preferred embodiment of a single button to be pushed, is also connected to the control sequencer 14. A plurality of manual activation pads may be used if desired. The alarm sensors 12 and the manual activation pad 16 signal the control sequencer 14 to begin operation of the system 10. A reset pad 18 is also connected to the control sequencer 14 to reset the system 10, for example, in the case of a false alarm. In the preferred embodiment, the reset pad 18 comprises a numeric pad wherein the user enters a preset numerical code in order to reset the system. The control sequencer 14 is connected to lights 20 and to a sequence time controller 22. The control sequencer 14 may be hardwired and contain EPROMs, PROMs, or other control hardware to perform its functions, or it may be partially or fully software controlled by means of a microcomputer.

All connections in the system 10 shown in FIG. 1, except for those connections providing power, are by means of wire or fiber optic cables. Power connections are through conventional power cables. The power connections are shown by dotted lines in FIG. 1.

The sequence time controller 22 serves as the main controller for the system 10. The sequence time controller 22 may be hardwired and contain EPROMs, PROMs, or other control hardware to perform its functions, or it may be partially or fully software controlled by means of a microcomputer. If desired, the functions of the control sequencer 14 and sequence time controller 22 may be performed by a single controller or microcomputer. Among other functions, the sequence time controller 22 controls the operation of a video/audio recording unit 24. Such control can result in, for example, turning on and off the recording unit 24, focusing the optics in the unit 24, adjusting the position of the unit 24, etc. The recording unit 24 may be mounted on a motorized movable platform to enable the sequence time controller 22 to adjust its position. In the preferred embodiment, the recording unit 24 comprises a lens, microphone, electronic CCD (charge coupled device) to sense still color video images, and other necessary video, audio, and electronic components. An example of a suitable recording unit 24 is the recording unit used in the Sony MAVICA A10 still video camera.

Some large facilities, such as a warehouse, may require more than one recording unit 24. Multiple recording units 24 may also be required in other installations in which a single recording unit 24 may not be able adequately to view the complete facility, such as an installation in separate rooms. If multiple recording units 24 are used, multiple sequence time controllers 22, each controlling a particular recording unit, may be used for convenience, although it is contemplated that a single sequence time controller 22 will be adequate to control multiple recording units.

The sequence time controller 22 controls how many video images will be taken by the recording unit 24, how far apart in time they will be, and when and for how long accompanying audio will be recorded. The recording unit 24 outputs its signals to a memory unit converter 26, which, in the preferred embodiment, converts the signals from the recording unit 24 to digital form and maintains an address register. The Sony MAVICA A10 camera provides capabilities that perform the majority of functions of the converter 26.

The converter 26 transmits the converted signals to a memory unit 28 for storage. In the preferred embodiment, the memory unit 28 comprises a 2" floppy magnetic disk with accompanying read/write head, which has the storage capacity of 25 to 50 still video images with accompanying audio. Preferably, the disk storage code and the signals conform to the unified standard designated by the Still Video Camera Committee. The converter 26 also provides the converted signals to a modem 30 for transmission to a base 34. The system 10 may communicate with the base 34 through wires, fiber optic cables, or electromagnetic waves. Signal transmission means such as radio frequencies, an integrated services digital network, telephone wires, or direct connections can be used. The video/audio signals are recorded and transmitted in digital form in the preferred embodiment.

The modem 30 sends identifying information such as time, location, and other pertinent data, together with the video and audio signals, to the base location 34. Such identifying information may be supplied by an EPROM chip or other means. An encryption device 36 may be provided to encode the signals sent. If desired, the video signals may be compressed using known compression techniques whereby they can be sent over low-grade telephone lines quickly.

The components of the system 10 are powered by an external power source 38, such as a municipal utility supplying power through a conventional ac power line, or an automobile battery when the system 10 is installed in an automobile. An internal standby power source 40 provides power to the system 10 in case of failure or removal of the external power source 38. The standby power source 40 may constitute a rechargeable battery.

Figure 2:
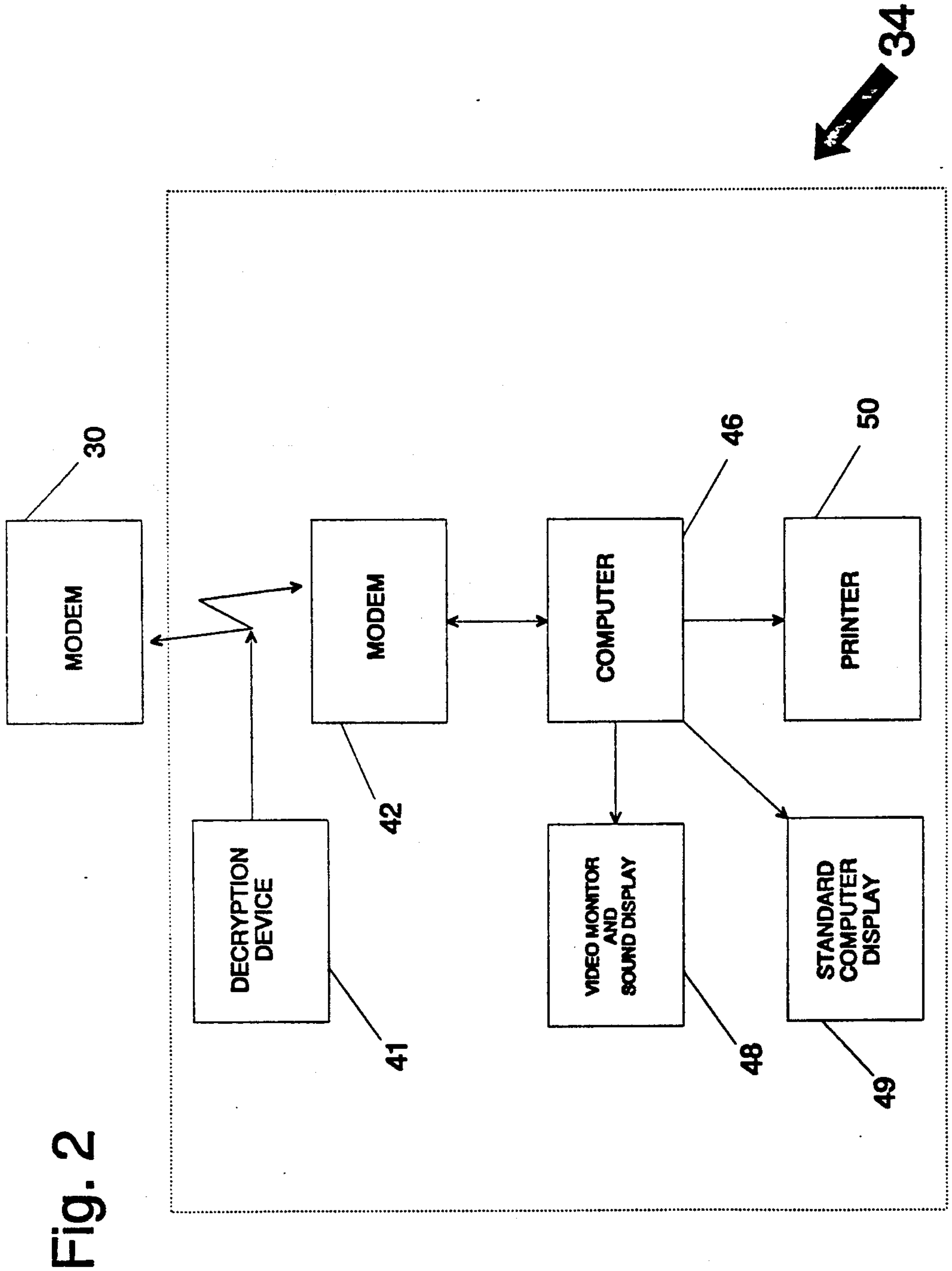
FIG. 2 is a block diagram further defining the elements of a base location of the system shown in FIG. 1.

Referring now to FIG. 2, the base 34 comprises a modem 42 for receiving the signals from the modem 30 shown in FIG. 1, and a decryption device 41, if desired. The base unit 34 has its own power supply (not shown). The modem 42 transmits the received signals to a computer 46, which may, for example, be one of any number of commercially available microcomputers, mini-computers, or comparable systems having video and audio processing capabilities. The computer 46 then stores the signals by conventional means, and displays or broadcasts the received video and audio information on a video monitor and sound display 48, using hardware and software programs such as the TARGA AVS4000 from Targa Systems Corp., Hartford, Conn. The display 48 comprises a standard video monitor, such as a Sony PVM1390, and audio speakers in the preferred embodiment. The computer 46 processes the video information and can print such information out on a printer 50. The printer 50 may comprise a video printer such as Sony Corporation's VIDEO PRINTER, or a standard computer printer. The computer 46 has a standard computer display 49 for interface with the operator.

The computer 46 may initiate communication with other parts of the system 10 through the modem 42, or through any other appropriate transmission medium, and perform any of the functions performed by the sequence time controller 22. For example, if the observer at the base location 34 wishes to receive the video and audio signals a second time, the computer 46 sends a command to the memory unit converter 26 to retrieve the images and audio from the memory 28 and transmit the signals to the modem 30, which in turn transmits the signals to the base 34.

The system 10 may be used, for example, for surveillance, information gathering, documentation, and protection against crime, accident, or natural disaster. Environments in which the system 10 may be installed include mobile environments such as motor vehicles, aircraft, and boats, and fixed environments such as banks, museums, homes, retail stores, and the like. The operation of the system 10 is described below with respect to four particular installations, namely, an automobile, airplane, bank, and residence.

Figure 3:
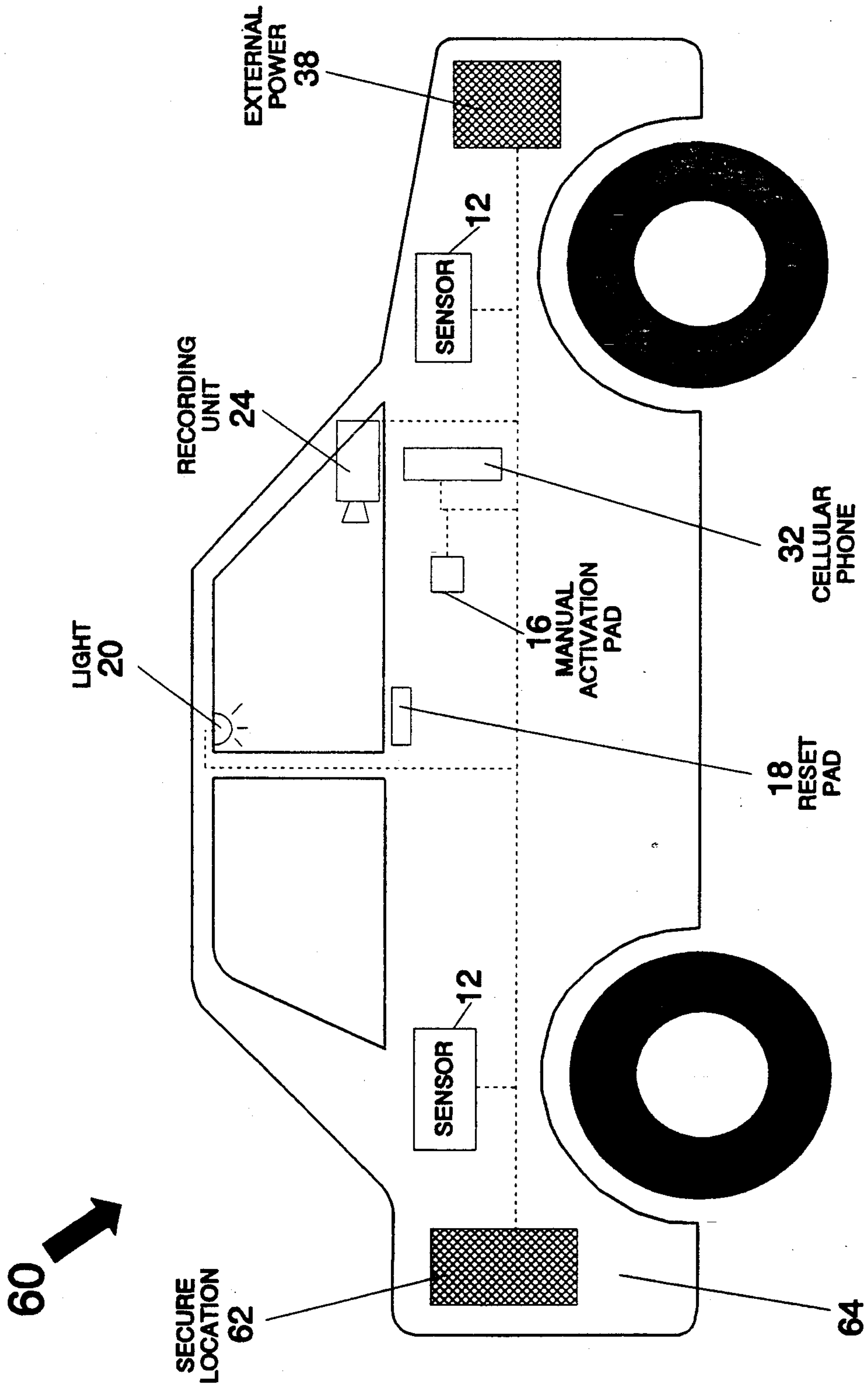
FIG. 3 is a schematic representation of the installation of the system of FIG. 1 in an automobile.

Referring now to FIG. 3, the system 10 as installed in an automobile 60 is shown. The automobile 60 may either be private or used as a taxicab or livery vehicle. One or more of the sensors 12 are placed in or about the automobile 60 to detect an alarm condition, including unauthorized entry, removal of a radio or cellular telephone, etc., by means of weight change, motion, or other conditions. The system 10 may be incorporated into an existing alarm system, if available, and use the sensors of the latter. The manual activation pad 16 is placed within easy reach of the driver of the vehicle for ready accessibility during an emergency. A reset pad 18 is installed near the door handle on the outside of the automobile 60, so that the authorized user of the automobile can enter the code resetting the system 10 in case of a false alarm, such as when the authorized user himself approaches the car and inadvertently creates an alarm condition. An additional reset pad 18 may be installed inside the automobile 60, if desired, in case the manual activation pad 16 is inadvertently activated.

The video/audio recording unit 24 is securely bolted on the dashboard of the automobile 60 and is provided with a protective covering, making its destruction or removal difficult. Alternatively, the recording unit 24 could be mounted on a rear view mirror, a livery vehicle meter, or other appropriate location. The lights 20 used by the system 10 are the interior lights of the automobile 60, or may be special flood lamps activated only when system 10 is activated. The control sequencer 14, the sequence time controller 22, the converter 26, the memory unit 28, the standby power unit 40, and the modem 30 are located in a secure and hidden place, indicated at 62, in the trunk 64 of the automobile 60. A cellular telephone 32, through which the modem 30 communicates with the base 34 by means of electromagnetic radiation, is located in the usual place in the vehicle, near the driver. The telephone 32 could alternatively be located in the trunk for use solely as a send-/receive signals device for the system 10.

The location of the various components of the system may of course be varied according to the specific application. It may also be desirable to vary the location of components from vehicle to vehicle solely for the purpose of avoiding familiarity with the system by persons who may wish to disable it.

In operation, the sensors 12 activate the control sequencer 14 upon an alarm condition, such as a thief breaking into the car or attempting to steal it. Alternatively, an occupant of the automobile 60 activates the manual activation pad 16, which activates the control sequencer 14, when an emergency situation occurs, such as a physical attack from inside or outside the automobile 60. Protection from such attacks is often a concern if the automobile 60 is used as a taxicab or livery vehicle. If a false alarm has occurred, or if it is determined that there is no longer a need for the operation of the system 10, the correct code is entered on the reset pad 18, which resets the system 10. An incorrect code entered on the reset pad 18 will have no effect.

The sensors 12 include means for determining the exact location of the unauthorized entry or other alarm condition in the automobile 60, in order to assist the recording unit 24 in the complete depiction of the scene. In the preferred embodiment, this is done by transmitting a code to the control sequencer 14 which denotes the location of the alarm condition. The code will be used by the sequence time controller 22 to move or rotate the recording unit 24 accordingly.

Once the control sequencer 14 is activated, it turns on the vehicle interior lights 20 (if the lights 20 are not already on) to provide adequate lighting for the video/audio recording unit 24. The control sequencer 14 then activates the sequence time controller 22, and transmits any location identifying code it has received from the sensors 12. The sequence time controller 22 activates the recording unit 24, and, if necessary, rotates it and focuses it according to the location code. In the preferred embodiment, the recording unit 24 takes still video images at a rate and number controlled by the sequence time controller 22, and records accompanying audio. The analog video/audio signals are then sent to the memory unit converter 26, which converts the analog signals into digital form, and transmits them to the memory unit 28 for storage. At the same time, the converter 26 sends the converted signals to the modem 30, which transmits the converted signals to the base 34 through the cellular telephone 32 under the control of the sequence time controller 22. The modem 30 also sends identifying information consisting of time of occurrence, automobile identification, owner identification, insurance company data, and the like.

Upon completion of the storing and transmission, the memory unit converter 26 retains the video and audio memory addresses for backup purposes, while updating new memory address registers for their start position in preparation for the next cycle. This dual write start area allows one full cycle to be in non-volatile memory even when the system is activated for a second event.

In the preferred embodiment, the base location 34 is located in a police station or other security station, so that the video and audio signals sent to the base location 34 may immediately be observed and acted upon. If an observer is not present at the base location 34 when the signals are transmitted from the system 10, the signals may be viewed and heard at a later time, since the signals are stored on the computer 46.

If the automobile 60 is not equipped with a cellular telephone 32 or some other communications device, the system 10 may simply record the video images and accompanying audio. Upon recovery of the automobile, the memory unit 28, comprising a floppy magnetic disk in the preferred embodiment, may be removed and the video images and audio examined by playback equipment to determine the identity of the intruder and circumstances of the alarm condition. A satisfactory playback device is the Sony MVP-660.

Figure 4:
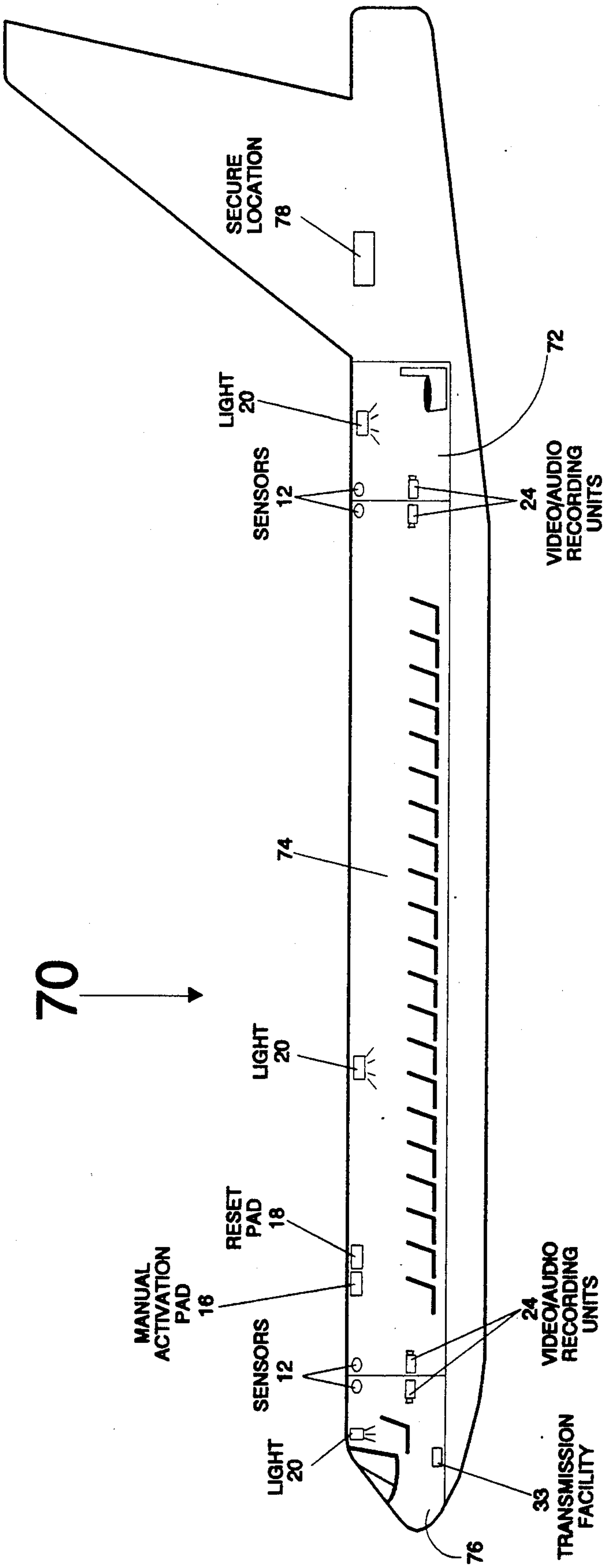
FIG. 4 is a schematic representation of the installation of the system of FIG. 1 in an airplane.

Referring now to FIG. 4, an airplane 70 with the system 10 installed is shown. The system 10 as installed in the airplane 70 may be made a part of the existing airplane security system or independent of it, as desired. In the event of a crime being committed on the airplane 70, such as a hijacking, it is advantageous to keep the system 10 largely independent of the other airplane security systems, both as a backup system and to keep the criminal unaware of the existence of another system monitoring his movements.

Sensors 12 are placed in the restrooms 72, passenger cabin 74, and cockpit 76 to detect an alarm condition indicative of a crime or accident, including the presence of an explosive material, excess movement in the cabin, or undue lurching of the airplane. Manual activation pads 16 and reset pads 18 are placed in locations where they may be easily activated by flight attendants or other persons.

Recording units 24 are located in the restrooms 72, passenger cabin 74, and cockpit 76 in sufficient numbers to adequately view the interior. If desired, a recording unit 24 may also be oriented to view the wings, engines, or external environment of the airplane 70.

The lights 20 and power 38 used by the system 10 are the interior lights and power of the airplane 70. The system standby power 40, control sequencer 14, sequence time controller 22, memory unit converter 26, and memory unit 28, are located in a hidden and secure location, indicated at 78, to prevent destruction from crime or accident. In the preferred embodiment, the system 10 communicates with the base location 34 via a conventional airplane/tower transmission facility 33 communicating through electromagnetic radiation.

The system 10 installed in the airplane 70 is similar in operation to the system 10 in the automobile 60. When a sensor 12 detects an alarm condition, or when a manual activation pad 16 is activated, a signal is sent to the control sequencer 14 along with a code denoting the location of the alarm condition. The control sequencer 14 turns on the airplane lights 20 at the location (if the lights 20 are not already turned on), and activates the sequence time controller 22. The sequence time controller 22 controls the recording of the events by the appropriate recording unit 24, the transmittal of the visual and audio signals output from the recording unit 24 into the memory unit converter 26 and memory unit 28, and the transmittal of the signals to the base 34 through the transmission facility 33, in the same manner as the installation in the automobile 10. The transmission facility 33 sends the visual and audio information to the base 34 along with airplane identification data, and may be connected to the airplane controls in order to determine the location of the airplane and transmit that as well.

In the event that the alarm condition spreads to more than one location, thus requiring more than one recording unit 24 to monitor the events, all activated recording units 24 will transmit signals to the memory unit converter 26, which will process them in a prearranged sequence or in some other manner. Alternatively, each recording unit 24 may be made a part of a separate system.

The base 34 is located in a control tower in the preferred embodiment. The transmission facility 33 is programmed to call up the nearest control tower that has a base 34 installed. If the transmission of the visual and audio signals to the base 34 is faulty or ineffective, a record of the events will be maintained in the memory unit 28, to be reviewed once the airplane 70 has landed.

Figure 5:
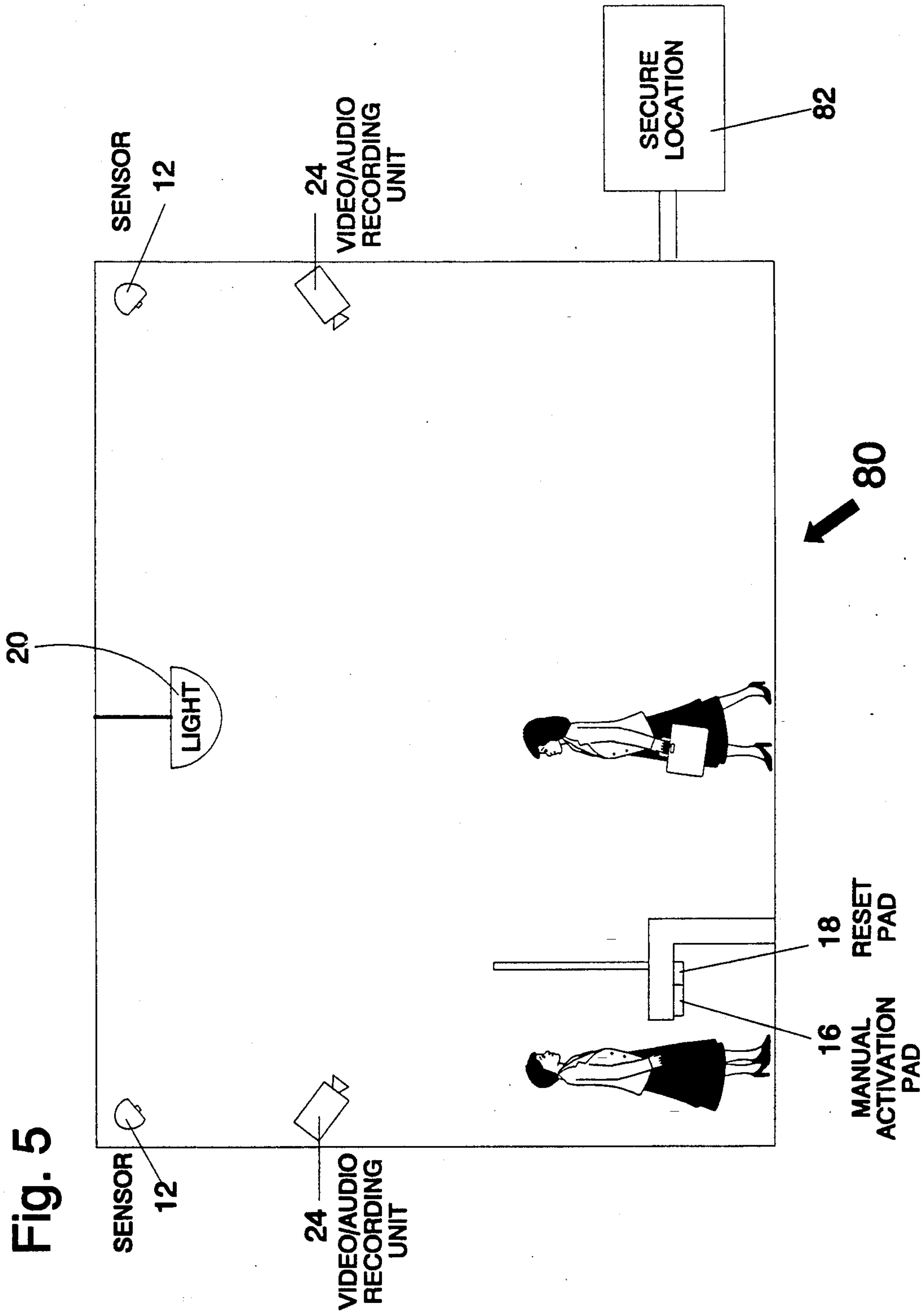
FIG. 5 is a schematic representation of the installation of the system of FIG. 1 in a bank.

Referring now to FIG. 5, the system 10 as installed in a bank 80 is shown. Like the airplane 70, the sensors 12 are located in various locations in the bank 80. The manual activation pads 16 and reset pads 18 are placed within easy reach of bank personnel under the teller counter. The recording units 24 are placed in sufficient number and location to substantially cover the interior of the bank 80. The lights 20 are the interior lights of the bank, and the power 38 is the power supplied by the municipal utility. The internal system power 40, control sequencer 14, sequence time controller 22, memory unit converter 26, memory unit 28, and modem 30 are placed in a secure and hidden location indicated at 82.

An alarm condition sensed by the sensors 12 may be the presence of firearms or undue movement in the bank 80. The system may also be activated by a manual activation pad 16. Once the sensors 12 or manual activation pads 16 activate the control sequencer 14, the system installed in the bank 80 operates in similar fashion to the system installed in the airplane 70 except that the modem 30 communicates with the base 34 through wires or fiber optic cables instead of electromagnetic waves, although the latter could be used, if desired.

The base 34 receiving the signals from the system 10 in the bank 80 may be located in a police station, other security organization, or bank headquarters.

Figure 6:
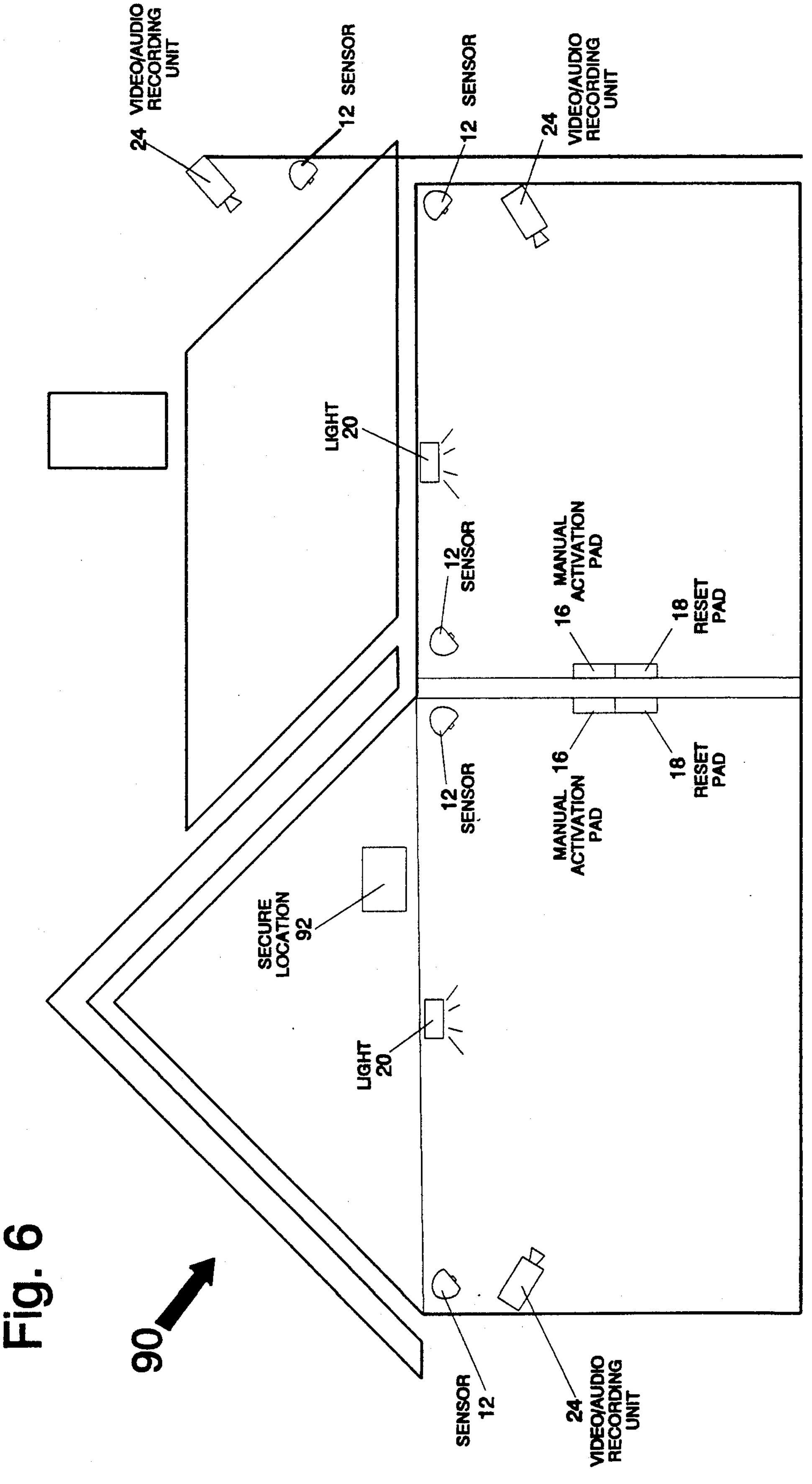
FIG. 6 is a schematic representation of the installation of the system of FIG. 1 in a residence.

Referring now to FIG. 6, the system 10 as installed in a residence 90 is shown. Like the bank 80, the sensors 12 are located in various locations in and around the residence 90 to detect unauthorized entry, smoke, and other alarm conditions. The manual activation pads 16 and reset pads 18 are placed within easy reach of persons in the residence. The recording units 24 are placed in sufficient number and location to substantially cover the interior and/or exterior of the residence 90. The lights 20 are the interior and exterior lights of the residence. Floodlamps may be added to further illuminate the exterior, if desired. The power 38 is supplied by the municipal utility. The internal system power 40, control sequencer 14, sequence time controller 22, memory unit converter 26, and memory unit 28 are placed in a secure location indicated at 92.

Once the sensors 12 or manual activation pads 16 activate the control sequencer 14, the system installed in the residence 90 operates in similar fashion to the system installed in the bank 80. The base 34 receiving the signals from the system 10 in the residence 90 may be located in a police station or other security organization.

The system 10 described herein is only one embodiment of the invention, and its description is intended to be illustrative only. Variations of and modifications to the described embodiment will be apparent to those skilled in the art. Our invention is defined by the following claims:

We claim:

1. A security and detection system, comprising:
- sensor means for sensing an alarm condition and for generating a first signal when an alarm condition is sensed;
- manual activation means for generating a second signal upon manual activation by a user;
- video and audio recording means responsive to the conditions represented by said first signal and said second signal for recording images and accompanying sound information, and for generating corresponding video and audio signals;
- memory converter means for converting said video and audio signals to a format convenient for storage and transmission;
- memory means for storing said converted signals; and
- transmission means for transmitting said converted signals to a base unit at a remote location.

2. The system of claim 1 wherein images are recorded in still-video format.

3. The system of claim 1 wherein said converted signals are in digital format.

4. The system of claim 1 wherein said base unit comprises:

means for receiving said converted signals; and means for storing said converted signals and for visual and audio presentation of said converted signals.

5. The system of claim 4 also comprising a computer for controlling the visual and audio presentation of said converted signals.

6. The system of claim 4 also comprising printing means for printing the visual portion of the converted signals.

7. The system of claim 5 wherein said computer also controls said video and audio recording means, said memory converter means, said memory means, and said transmission means.

8. The system of claim 1, further comprising means for encrypting said converted signals prior to transmission to said base unit, and means for decrypting said converted signals subsequent to transmission to said base unit.

9. The system of claim 1 also comprising control means responsive to said first signal and said second signal for controlling the physical movement and activation of said video and audio recording means.

10. The system of claim 9 also comprising reset means for resetting the control means.

11. The system of claim 9 also comprising illumination means responsive to said control means.

12. The system of claim 9 wherein said control means comprises:

control sequencer means responsive to said first signal and said second signal for generating a third signal when said alarm condition is sensed or upon activation of said manual activation means; and sequence time controller means responsive to said third signal for controlling said video and audio recording means.

13. A security and detection system, comprising:

sensor means for sensing an alarm condition and for generating a first signal when an alarm condition is sensed;

manual activation means for generating a second signal upon manual activation by a user;

video recording means responsive to the conditions represented by said first signal and said second signal for recording still-video images, and for generating corresponding video signals;

memory unit converter means for converting said video signals to a format convenient for storage and transmission;

memory means for storing said converted signals; and transmission means for transmitting said converted signals to a base unit at a remote location.

14. The system of claim 13 wherein said converted signals are in digital format.

15. The system of claim 13 wherein said base unit comprises:

means for receiving said converted signals; and recorder/player means for recording said converted signals and for visual display of said converted signals.

16. The system of claim 13 also comprising a computer for controlling the visual display of said converted signals.

17. The system of claim 13 also comprising printing means for printing the visual information from the converted signals.

18. The system of claim 16 wherein said computer also controls said video recording means, said memory converter means, said memory unit, and said transmission means.

19. The system of claim 13, further comprising means for encrypting said converted signals prior to transmission to said base unit, and means for decrypting said converted signals subsequent to transmission to said base unit.

20. The system of claim 13 also comprising control means responsive to said first signal and said second signal for controlling said video recording means.

21. The system of claim 20 also comprising reset means for resetting the control means.

22. The system of claim 20 also comprising illumination means responsive to said control means.

23. The system of claim 20 wherein said control means comprises:

control sequencer means responsive to said first signal and said second signal for generating a third signal when said alarm condition is sensed or upon activation of said manual activation means; and sequence time controller means responsive to said third signal for controlling said video recording means.

24. The system of claims 1 or 13, wherein said transmission means transmits said converted signals to the base unit through electromagnetic radiation when said system is installed in a mobile environment.

25. The system of claims 1 or 13, wherein said transmission means transmits said converted signals to the base unit through electromagnetic radiation when said system is installed in a fixed environment.

26. The system of claims 1 or 13, wherein said transmission means transmits said converted signals to the base unit through wires when said system is installed in a fixed environment.

27. The system of claims 1 or 13, wherein said transmission means transmits said converted signals to the base unit through fiber optic cables when said system is installed in a fixed environment.

28. The system of claims 12 or 23 also comprising power means for providing power to all system elements.

29. A method of recording, storing, and observing at a remote location events relating to an alarm condition, comprising the steps of:

sensing a first alarm condition;

recording the events in still-video format and accompanying audio, and producing corresponding electrical video and audio signals;

converting the video and audio signals to digital signals;

storing the digital signals;

placing the memory location addresses of the stored information in a memory address register;

transmitting the digital signals to a base location; and updating the memory address register to start position in preparation of receipt of further signals relating to a second alarm condition, while retaining the memory location addresses of the stored information for backup purposes.

30. The method of claim 29, further comprising the steps of storing the digital signals at the base location, visually and audibly presenting the digital signals at the base location, and printing the image portion of the digital signals at the base location.

31. The method of claim 29, further comprising the steps of encrypting the digital information prior to transmitting the digital information to the base location, and decrypting the digital information subsequent to transmitting the digital information to the base location.

32. The method of claim 29, further comprising the step of stopping said recording of the events, said converting of the visual and audio signals, said storage of the digital signals, and said transmitting of the digital signals, upon entry of a preset code on a reset pad.

33. A method of observing, recording, and transmitting information concerning events, comprising the steps of:

manually activating a still-video camera;

recording by means of the camera the events in still-video format and accompanying audio, and producing corresponding electrical video and audio signals;

converting the video and audio signals to digital signals;

storing the digital signals;

placing the memory location addresses of the stored information in a memory address register;

transmitting the digital signals to a base location; and updating the memory address register to start position in preparation of receipt of further signals pursuant to another cycle of operation, while retaining the memory location addresses of the stored information for backup purposes.

* * * * *